Jan. 3, 1939. F. STOCKER 2,142,418
COFFEE MAKER STOVE
Filed Sept. 8, 1936 2 Sheets-Sheet 2
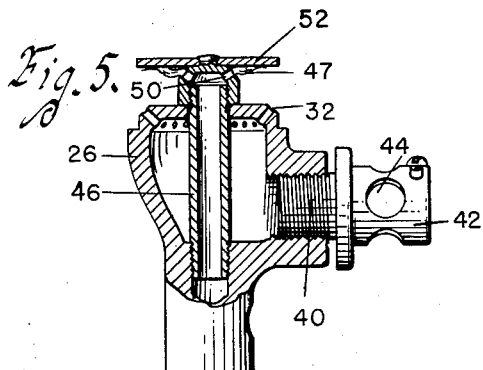
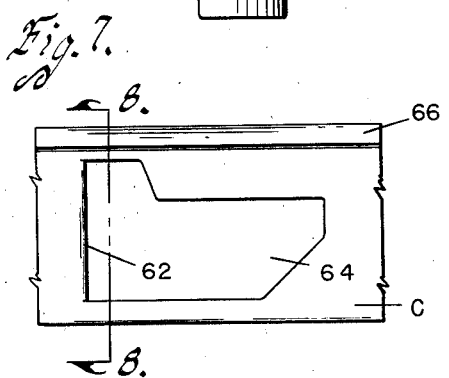
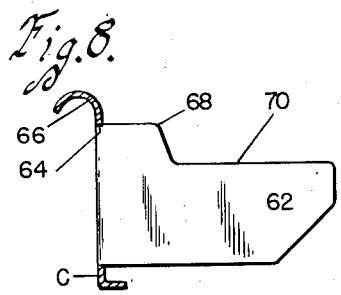
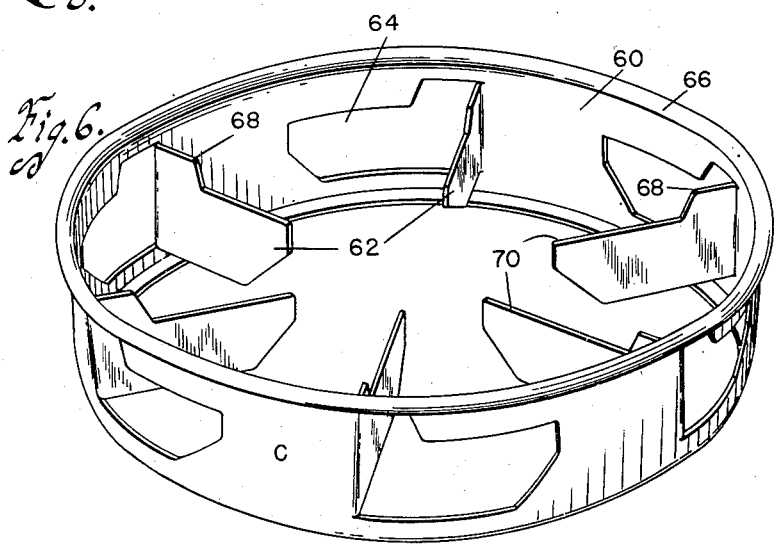

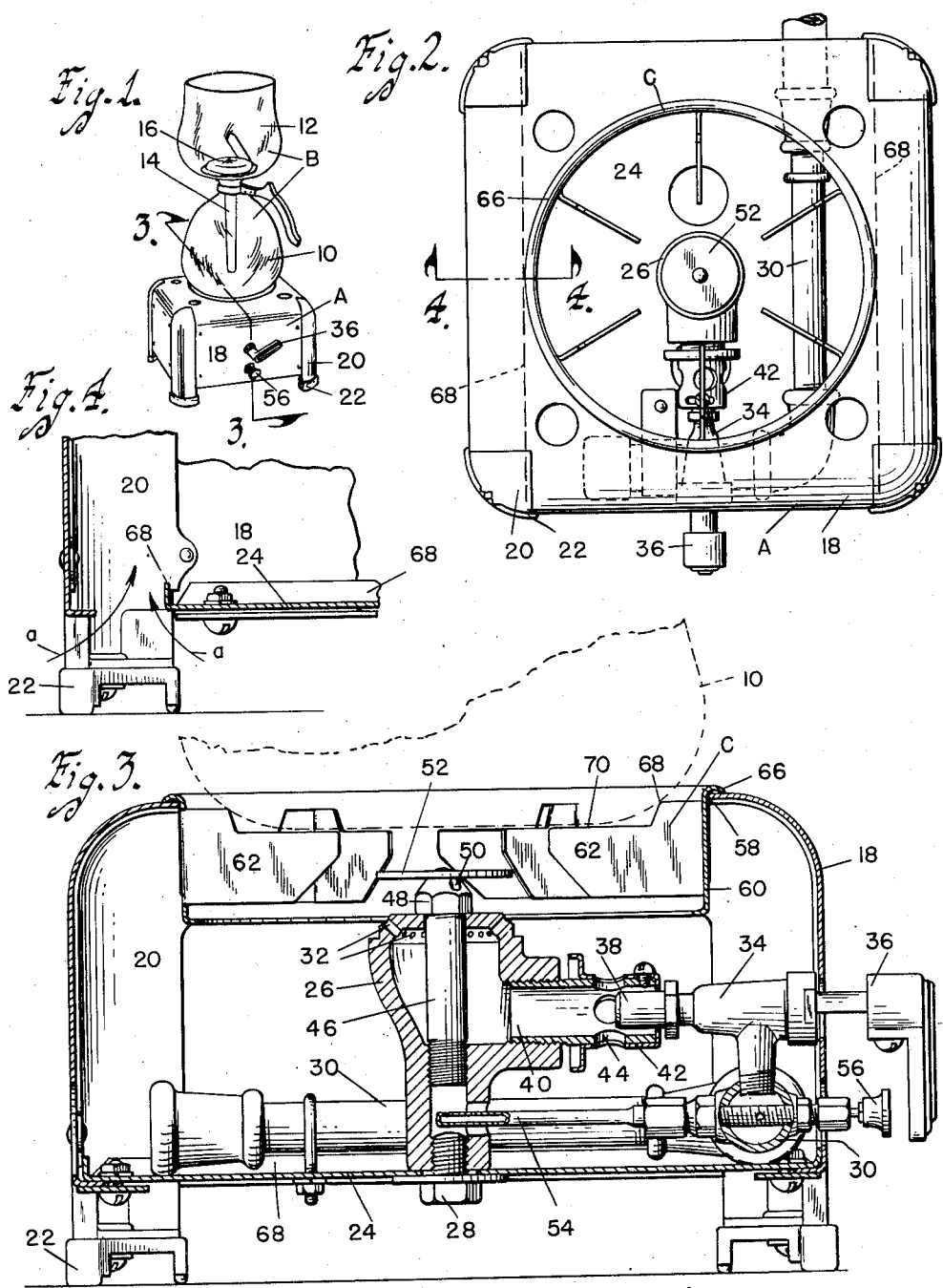

Patented Jan. 3, 1939

2,142,418

UNITED STATES PATENT OFFICE 2,142,418

COFFEE MAKER STOVE

Frederick Stocker, Chicago, Ill., assignor to National Stamping & Electric Works, Chicago, Ill., a corporation of Illinois Application September 8, 1936, Serial No. 99,770

2 Claims. (Cl. 126—40)

An object of my invention is to provide a stove of simple, durable and inexpensive construction, particularly adapted for use in connection with vacuum type coffee makers such as disclosed in my co-pending application Serial Number 99,769, filed Sept. 8, 1936.

A further object is to provide a stove for coffee makers which facilitates the brewing operation, due particularly to the construction of the burner and a pilot light therefor, and of a supporting grid for the coffee maker.

Still a further object is to provide a stove of the character disclosed in which a grid of sheet metal is used comprising an annular supporting flange and a plurality of supporting fingers cut therefrom and bent inwardly toward each other, the fingers having point contact of minimum area with the coffee maker so as to prevent glass breakage, yet provide efficient cooling which is necessary to quick operation of the coffee making process.

A further object is to provide a coffee maker supporting grid against which the coffee maker, even though made of glass, may be engaged with considerable force, yet without danger of breakage of the coffee maker.

A further object is to provide a stove which includes a pilot light having individual control whereby the pilot light can be controlled independently of the burner and thus the pilot flame regulated to the proper size for securing the best results.

Another object is to provide in connection with the pilot light a shield which prevents prohibitive heating of the coffee maker by the pilot light, thus facilitating the coffee making process.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of a coffee maker stove showing the coffee maker associated therewith.

Figure 2 is an enlarged plan view of the stove per se.

Figure 3 is an enlarged sectional view on the line 3—3 of Figure 1 showing details of construction of the stove.

Figure 4 is a sectional view on the line 4—4 of Figure 2 showing a further detail.

Figure 5 is a sectional view of the pilot tube shown in Figure 3 and illustrating its association with the burner of the stove.

Figure 6 is a perspective view of a coffee maker supporting grid forming part of my stove.

Figure 7 is a fragmentary side elevation of the grid; and

Figure 8 is a sectional view on the line 8—8 of Figure 7.

On the accompanying drawings I have used the reference character A to indicate generally my stove and B a coffee maker. The coffee maker B as disclosed in my co-pending application includes in general a lower bowl 10, an upper bowl 12 having a well 14 and a filter 16.

The stove A includes a casing 18 preferably formed of sheet metal and of box-like formation. At each corner of the casing 18 a supporting leg 20 is riveted or otherwise suitably secured and terminates in a supporting foot 22 preferably of heat insulating material. The stove A has a bottom plate 24 serving as a support for a burner casting 26. The casting 26 is secured to the plate 24 by a cap screw 28.

Gas piping 30 supplies gas to the burner 26, the flame emission openings of which are indicated at 32. A control valve 34 having an operating handle 36 is provided for controlling the supply of gas to the burner 26. The valve 34 has a nozzle 38 extending into an air admission fitting 40 which is supported by the burner casting 26.

A sleeve 42 is provided on the air admission fitting 40 for controlling the amount of air admitted through openings 44.

Within the burner 26 a pilot tube 46 is located and terminates in a head 48 having pilot flame emission openings 50. A shield plate or disk 52 is mounted on the head 48 and serves a purpose which will hereinafter appear. Gas is admitted to the pilot tube 46 from a gas tube 54 controlled by a needle valve 56 independently of the valve 34. This enables the operator to control the size of the pilot flame as desired.

The upper surface of the casing 18 is provided with an opening 58 into which a grid C is extended. The grid C, as best shown in Figure 6, comprises an annular vertical flange 60 and a plurality of supporting fingers 62. These are formed of a single sheet of metal. The fingers are cut out of the flange 60, thus leaving ventilating openings 64 which serve a very definite and desirable purpose.

At the top of the vertical flange 60 an outwardly extending flange 66 is provided which rests on the edge of the casing 18 adjacent the opening 58 therein. This limits the grid C against downward movement relative to the casing 18, and the grid is thereby supported.

The fingers 62 are provided with contact shoulders 68 inward of which edges 70 are provided. The contact shoulders 68 engage and support the lower bowl 10 which is shown by dotted lines in Figure 3, while the edges 70 prevent the bowl from canting or undesirable tipping.

The grid C being made of sheet metal as described serves a number of useful purposes. It prevents breakage of the glass bowl 10 even when the bowl is set violently on the grid. This is due to the fingers 62 being made of sheet metal and accordingly being somewhat resilient and lacking sufficient inertia to check the movement of the bowl 10 to such an extent that it breaks it as in the case of cast iron grids. This eliminates breaking of the bowl 10 due to careless placing of it on the grid, and this effects a very substantial saving to restaurant owners and the like who invest in a number of the coffee makers and where the operators thereof are more or less careless, especially during rush hours.

The fingers 62 being made of sheet metal serve a further purpose of hastening the coffee brewing operation inasmuch as after the water in the bowl 10 has been boiled sufficiently to cause it to be displaced from the bowl 10 into the bowl 12, it will return quickly only if the bowl 10 is cooled quickly to thus form a vacuum therein which draws the liquid coffee from the upper bowl 12 back into the bowl 10. Cast iron grids have so much residual heat that they slow down this operation, whereas a comparatively light sheet metal grid as disclosed can cool quickly and thus effect quick return of the coffee and facilitate completion of the coffee brewing process.

The ventilating openings 64 aid in cooling of the fingers 62, as air can flow through them and past the fingers as well as upwardly through the bottom of the grid and past the fingers.

The supporting plate 24, as shown in Figure 4, terminates short of the casing 18, the point of termination being the flanges 68 which are shown by dotted lines in Figure 2. This provides spaces through which the cooling air can flow as indicated by the arrows $a$ in Figure 4.

With cast iron grids there is also experienced considerable breakage of the bowls 10 due to the uneven heating thereof. During operation, the portions of the cast iron grid which contact with the bowl 10 heat the contacting portions of the bowl to a greater extent than other portions thereof which are subjected to air flowing through the stove and past such other portions. This uneven heating results in expansion and contraction strains in the glass bowl which are excessive and which in time break the bowl. With my type of grid there is a minimum contact with the bowl and maximum air space around it, resulting in an even temperature across the entire lower surface of the bowl.

The supporting fingers 62 being relatively narrow in their horizontal dimension afford minimum obstruction between the heat of the burner and the bowl 10. This eliminates the possibility of any hot spots or greater expansion of the material of the bowl at one place than another. This minimum contact of the grid with the bowl and maximum contact of air with the bowl also facilitates quick cooling of the bowl after the burner is turned off, and consequently quick return of the brewed coffee into the bowl, thus resulting in a more complete coffee brewing operation.

The shield 52 above the pilot flame, which is indicated at 47 in Figure 5, minimizes the heating effect of the pilot flame on the bowl 10, thus permitting the use of a pilot light, yet securing quick operation of the coffee maker, the speed of operation of which would be reduced if the heat of the pilot light affected the bowl to the extent that it would if the shield were not provided. The shield also deflects the pilot flame to a position where it will instantly light the burner when the valve 34 is opened.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a stove construction, a sheet metal casing comprising a single sheet of material having a top portion, said top portion having a grate opening therein, said sheet of material having side and end walls curved on a radius and bent downwardly from the sides and ends of said top portion, leaving the corners of said casing open, and vertically arranged elongated elements for closing said open corners of said casing and serving as supporting legs for said casing, said elongated elements being secured to said single sheet of material at the ends of said side and end walls, whereby to provide a unitary casing and supporting means therefor, which spaces the bottom of the casing above a supporting surface.

2. In a stove construction, a casing comprising a single element of sheet metal having a top portion and side and end walls bent downwardly from the sides and ends of said top portion and providing rounded upper corners, said top portion having therein a grate opening, the lower edges of said side and end walls having inturned flanges, the ends of said side and end walls terminating short of each other, thereby leaving the corners of said casing open, and supporting elements filling said open corners, said supporting elements being curved to form substantially a quarter circle in horizontal cross section and the upper ends thereof being also curved, whereby to fill said open corners and provide a continuation of the contour of the side and end walls of said casing and the rounded upper corners thereof, said supporting elements having portions extending below the lower edges of said side and end walls, whereby to space the bottom of the casing above a supporting surface.

FREDERICK STOCKER.